US009588656B2

(12) United States Patent
Franzen

(10) Patent No.: US 9,588,656 B2
(45) Date of Patent: Mar. 7, 2017

(54) METHOD FOR AUTOMATIC DISPLAY OF POSSIBLE CONNECTIONS AND AUTOMATIC CONNECTION OF MODEL COMPONENTS OF A MODEL OF A TECHNICAL SYSTEM

(71) Applicant: dSPACE digital signal processing and control engineering GmbH, Paderborn (DE)

(72) Inventor: Ortwin Ludger Franzen, Bad Lippspringe (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 556 days.

(21) Appl. No.: 14/187,547

(22) Filed: Feb. 24, 2014

(65) Prior Publication Data

US 2015/0149944 A1 May 28, 2015

(30) Foreign Application Priority Data

Nov. 25, 2013 (EP) ..................................... 13194228

(51) Int. Cl.
*G06F 3/048* (2013.01)
*G06F 3/0484* (2013.01)
(Continued)

(52) U.S. Cl.
CPC ........... *G06F 3/0484* (2013.01); *G05B 17/02* (2013.01); *G05B 19/0426* (2013.01)

(58) Field of Classification Search
CPC .................. G05B 19/0426; G06F 3/0484
See application file for complete search history.

(56) References Cited

U.S. PATENT DOCUMENTS 5,386,413 A * 1/1995 McAuley ............. H04Q 3/0016
370/392
5,940,783 A * 8/1999 Kukutsu ............ G01R 31/3185
702/120

(Continued)

FOREIGN PATENT DOCUMENTS

EP        1 901 146 A1    3/2008
WO     WO 2005/124479 A1  12/2005

OTHER PUBLICATIONS

European Search Report and Office Action for European Application No. 13194228.6 dated May 8, 2014 with English translation.

*Primary Examiner* — Omar Abdul-Ali
(74) *Attorney, Agent, or Firm* — Muncy, Geissler, Olds & Lowe, P.C.

(57) ABSTRACT

A method for automatic connection of model components of a model of a technical system on a computer with a display, wherein the model has a first model component and a second model component. The first model component and the second model component each have at least one hierarchy element, wherein a hierarchy element contains no hierarchy element, or one hierarchy element, or multiple hierarchy elements. A hierarchy element has no port, or one port, or multiple ports, wherein a hierarchy element and a port have an identifier. A connection between two ports represents an assignment in the technical system. A first set of hierarchy elements and/or ports and a second set of hierarchy elements and/or ports is selected through a graphical user action, wherein a possible assignment is tested for a first port of the first set and a second port of the second set. A possible assignment is present if, for the first port and the second port, and ascending from the first port and the second port in accordance with the hierarchy, the identifiers of the hierarchy elements that are at a higher level than the first port and the second port each correspond at equal hierarchy levels up (Continued)

to a predefinable number of hierarchy levels starting from the port, or are evaluated as corresponding in accordance with a predefined rule. If a possible assignment is present, the possible assignment is displayed and/or the first port of the first set is automatically connected to the second port of the second set.

9 Claims, 16 Drawing Sheets

(51) Int. Cl.
*G05B 17/02* (2006.01)
*G05B 19/042* (2006.01)

(56) References Cited

U.S. PATENT DOCUMENTS

| | | |
|---|---|---|
| 7,596,417 B2 | 9/2009 | Fister et al. |
| 7,877,153 B2 | 1/2011 | Biermann et al. |
| 2008/0091279 A1 | 4/2008 | Biermann et al. |
| 2010/0114619 A1 | 5/2010 | Birsan et al. |

\* cited by examiner

| Identifiers of the port and hierarchy elements of a port of the first set | Identifiers of the port and hierarchy elements of a port of the second set | Number of correspondences |
|---|---|---|
| Signal1, PDU1, ECU2, Interface  26.7 | Signal1, PDU1, ECU1, Group, Interface 6.1 | 2 |
| | Signal2, PDU1, ECU1, Group, Interface 6.2 | 0 |
| | Signal3, PDU1, ECU1, Group, Interface 6.3 | 0 |
| | Signal4, PDU1, ECU1, Group, Interface 6.4 | 0 |
| | Signal1, PDU2, ECU1, Group, Interface 6.5 | 1 |
| | Signal2, PDU2, ECU1, Group, Interface 6.6 | 0 |
| | Signal1, PDU1, ECU2, Group, Interface 6.7 | 3 |
| | Signal5, PDU1, ECU2, Group, Interface 6.8 | 0 |
| | Signal1, PDU4, ECU2, Group, Interface 6.9 | 1 |
| | Signal2, PDU4, ECU2, Group, Interface 6.10 | 0 |
| Signal5, PDU1, ECU2, Interface  26.8 | Signal1, PDU1, ECU1, Group, Interface 6.1 | 0 |
| | Signal2, PDU1, ECU1, Group, Interface 6.2 | 0 |
| | Signal3, PDU1, ECU1, Group, Interface 6.3 | 0 |
| | Signal4, PDU1, ECU1, Group, Interface 6.4 | 0 |
| | Signal1, PDU2, ECU1, Group, Interface 6.5 | 0 |
| | Signal2, PDU2, ECU1, Group, Interface 6.6 | 0 |
| | Signal1, PDU1, ECU2, Group, Interface 6.7 | 0 |
| | Signal5, PDU1, ECU2, Group, Interface 6.8 | 3 |
| | Signal1, PDU4, ECU2, Group, Interface 6.9 | 0 |
| | Signal2, PDU4, ECU2, Group, Interface 6.10 | 0 |

Figure 7

| Identifiers of the port and nonexcluded hierarchy elements of a port of the first set | Identifiers of the port and nonexcluded hierarchy elements of a port of the second set | Number of correspondences |
|---|---|---|
| Signal1, PDU1, ECU2, Interface 26.7 | Signal1, PDU1, ECU1, Interface 6.1 | 2 |
| | Signal2, PDU1, ECU1, Interface 6.2 | 0 |
| | Signal3, PDU1, ECU1, Interface 6.3 | 0 |
| | Signal4, PDU1, ECU1, Interface 6.4 | 0 |
| | Signal1, PDU2, ECU1, Interface 6.5 | 1 |
| | Signal2, PDU2, ECU1, Interface 6.6 | 0 |
| | Signal1, PDU1, ECU2, Interface 6.7 | 4 |
| | Signal5, PDU1, ECU2, Interface 6.8 | 0 |
| | Signal1, PDU4, ECU2, Interface 6.9 | 1 |
| | Signal2, PDU4, ECU2, Interface 6.10 | 0 |
| Signal5, PDU1, ECU2, Interface 26.8 | Signal1, PDU1, ECU1, Interface 6.1 | 0 |
| | Signal2, PDU1, ECU1, Interface 6.2 | 0 |
| | Signal3, PDU1, ECU1, Interface 6.3 | 0 |
| | Signal4, PDU1, ECU1, Interface 6.4 | 0 |
| | Signal1, PDU2, ECU1, Interface 6.5 | 0 |
| | Signal2, PDU2, ECU1, Interface 6.6 | 0 |
| | Signal1, PDU1, ECU2, Interface 6.7 | 0 |
| | Signal5, PDU1, ECU2, Interface 6.8 | 4 |
| | Signal1, PDU4, ECU2, Interface 6.9 | 0 |
| | Signal2, PDU4, ECU2, Interface 6.10 | 0 |

Figure 8

|        | 26.7c | 26.8c | 26.9c | 26.10c |
|--------|-------|-------|-------|--------|
| 6.1b   | 2     | 0     | 1     | 0      |
| 6.2b   | 0     | 0     | 0     | 1      |
| 6.3b   | 0     | 0     | 0     | 0      |
| 6.4b   | 0     | 0     | 0     | 0      |
| 6.5b   | 1     | 0     | 1     | 0      |
| 6.6b   | 0     | 0     | 0     | 1      |
| 6.7b   | 3     | 0     | 1     | 0      |
| 6.8b   | 0     | 3     | 0     | 0      |
| 6.9b   | 1     | 0     | 3     | 0      |
| 6.10b  | 0     | 0     | 0     | 3      |

Figure 12

METHOD FOR AUTOMATIC DISPLAY OF POSSIBLE CONNECTIONS AND AUTOMATIC CONNECTION OF MODEL COMPONENTS OF A MODEL OF A TECHNICAL SYSTEM

This nonprovisional application claims priority to European Application No. EP 13194228.6, which was filed on Nov. 25, 2013, and which is herein incorporated by reference.

BACKGROUND OF THE INVENTION

Field of the Invention

The invention relates to a method for automatic display of possible connections and for connecting model components of a model of a technical system on a computer with a display, wherein the model has at least a first model component and a second model component, wherein the first model component and the second model component each have at least one hierarchy element. A hierarchy element contains no hierarchy element, or one hierarchy element, or multiple hierarchy elements, wherein a hierarchy element has no port, one port, or multiple ports. A hierarchy element and/or a port have an identifier.

A connection between a first port and a second port represents an assignment in the technical system. A first set of hierarchy elements and/or ports and a second set of hierarchy elements and/or ports can be selected through a graphical user action.

Description of the Background Art

Methods for connecting model components of a model of a technical system have been known in the prior art in graphical programming environments, modeling environments, configuration environments, and model integration environments, where the model of a technical system typically is a block-based or tree-shaped abstract graphical representation of an real existing technical system, to be developed technical system and/or to be simulated technical system, oftentimes the technical system is an electronic control system with an electronic computing unit and I/O devices connected to this computing unit. Such technical systems can be very complex; for example, they can represent all the electronics of a motor vehicle and/or the physical environment of a motor vehicle, and can have a plurality of model components that are connected to one another through interfaces with thousands of ports, which is to say inputs and/or outputs, and thus stand in functional relationship with one another, which is visualized through corresponding connecting lines, for example.

The model components can be model components of the same type, which is to say, for example, exclusively model components of an abstract mathematical model of the technical system, such as has long been known from block diagrams in control engineering which use the tools of mathematics (transfer functions, lookup tables, etc.) to describe the physical and technical functionality of the technical system.

Frequently, however, models of a technical system have model components of different types, which is due to the fact that these models of technical systems or parts of technical systems are produced in order to interact with other, real technical systems or with parts of real technical systems. This scenario occurs in the development and testing of control units or in the development of open-loop/closed-loop controls to be implemented on control units. Oftentimes the control unit here is physically present as hardware to be tested that has suitable I/O interfaces. In order to test the control unit reliably and in a simple manner, the control unit's environment—a physical process—is represented using a mathematical model in a simulator that can calculate the physical process in real time. The quantities that are to be measured by the control unit and that are to be output by the control unit as a response are output or measured by appropriately programmable I/O interfaces of the simulator. The test method described above is also referred to as hardware-in-the-loop simulation. In the model of the technical system, representatives for the inputs and outputs of the control unit and an environment model are accordingly present, and are connected to one another in the model. Moreover, I/O functions can be defined and configured, which determine how the environment model and control unit should interact and what control unit input or output should interact with what part of the model and with what interface of the environment model. Other application cases for the creation of models of technical systems are summarized under the term "rapid control prototyping", for example. Here, to return to the aforementioned structure, in practical terms the control unit and the controller to be implemented on the control unit are simulated and are tested together with the actual technical process. In both test scenarios for which the model of a technical system or a part of a technical system is to be created, the different areas of the test system, which is to say control unit hardware, I/O interfaces of the simulator, and the mathematical model of the technical process, are brought together on the simulator.

An environment for configuration and model integration in which the model of the technical system includes model components of different types, which is to say model components of the mathematical model and/or model components of the I/O interfaces, in particular programmable I/O interfaces and/or model components of an actually present hardware device, is known from US 2008/0091279 A1, for example.

Each model component has one or more ports, which is to say inputs and/or outputs, through which two model components can be connected to one another. A connection of this nature in the model represents a connection in the technical system. Just as model components of the same type as well as of different types can be connected to one another, such a connection of model components represents different connections in the technical system. In particular, the connections between different types of model components represent physical connections between the areas of the test system, for example a cable between a control unit and a simulator, or logical connections, for example the link between a variable of the environment model and an I/O functionality of the simulator.

Specifically, when a plurality of signals to be transmitted or data elements are transferred between two model components, it is often the case that structuring of the model components is undertaken or model components and/or their interfaces are represented in a structured manner, for example in order to achieve a clearer representation and thus easier handling. Elements of this type for hierarchical structuring of a model component represent hierarchy elements, which in turn can contain other hierarchy elements for the purpose of structuring. In this context, the lowest hierarchy level is composed of the ports, which stand for an input, an output, or a bidirectional interface of the model component, or in other words represent the part of the model component through which data elements and/or signals are exchanged with another model component.

If no structuring of the model component is undertaken or represented, then as a rule the port identifiers must be supplemented in order to create a unique identification for the signals or data elements to be transmitted at the ports, for example by appending "_1", "_2", etc. In contrast, when a semantic structuring of the ports is present, this is frequently achieved by adding the structure information to the name of the port.

An unstructured model component 50*a* with an interface "Interface" 2*a* is shown by way of example in FIG. 1*a*.

In FIG. 1*a*, as in the subsequent figures, directional ports 6.1, . . . 6.10 and 26.1, . . . 26.10 are represented by triangles, with the direction of the triangle representing the direction of the signal or data flow of the applicable port. Thus, if the triangle points toward the model component, for example, an input port is represented, and if the triangle points away from the model component, for example, an output port is represented. Consequently, the ports 6.1 and 6.4 are output ports, while the ports 6.2, 6.3, 6.5, 6.6, 6.7, 6.8, 6.9, and 6.10 are input ports.

In addition, it is possible for there to be bidirectional ports, which in turn are represented by a different symbol, for example by a diamond instead of a triangle.

In FIG. 1*a* and the subsequent figures, for example, the signal "Signal1" appears at the ports 6.1, 6.5, 6.7, and 6.9, and consequently at different locations, with the signal flow direction and the context differing in the different instances, so that different information content absolutely can be transmitted through the port in the different instances. Now, in the unstructured model component in the example, the context of "Signal1"—_in this case the data unit PDU (Protocol Data Unit) in which the signal is transmitted over a bus, the control unit (ECU) that transmits it, and the group (such as, e.g., cluster or communications matrix) to which it belongs—is encoded in the port name, whereas in the structured representation of the model component in FIG. 1*b* and FIG. 2, the uniqueness is provided through the structure, and consequently the name of the signal can be used or represented directly as the name of the port. The structure is provided by the hierarchy elements interface 2, 22, group 3, 23, ECU1 4.1, 24.1, ECU2 4.2, 24.2, and the hierarchy elements for the PDUs 5.1, . . . 5.4, 25.1, . . . 25.4. A model component is thus structured by means of hierarchy elements, with it being possible for hierarchy elements to be nested within one another. Ports 6.1, . . . 16.10 are located on the lowest hierarchy level, although they may have different numbers of higher-level hierarchy levels, depending on what hierarchy level the hierarchy element having the port is located on.

According to the prior art, graphical operator and/or configuration tools, such as ConfigurationDesk and SystemDesk from dSPACE, provide the ability to connect individual ports on a graphical user interface to one another, for example by the means that the user draws a line between these ports.

It is likewise possible in the prior art to automatically connect ports that, as shown in FIG. 2, are located in two structured model components 55, 75 on the same hierarchy level in a graphical user interface, wherein it is preferred for exactly matching ports, i.e. ports that differ in direction but otherwise have the same identifiers at all hierarchy levels and have an identical hierarchy, to be automatically connected.

To this end, a first set of ports and a second set of ports must be selected, wherein the ports in the first set are to be automatically connected in a matching fashion to ports in the second set. Selection of ports can be accomplished by a selection of the ports themselves or by an indirect selection of the ports through their higher-level hierarchy elements or the model component. In this context, the selection of a model component or a hierarchy element means that all ports contained therein have been selected and thus belong to the corresponding set.

The selection takes place through a graphical user input, for example by selection from a list or selection in the graphical model components using an input device such as a mouse, a keyboard, or a touchscreen, for example.

The visual design means that is chosen to represent the hierarchy elements and ports, and their relationships, is irrelevant to the invention. Examples of advantageous embodiments include a tree representation and a representation as a structured block.

In FIG. 2 showing the prior art, for example, port 6.1*b* could thus be automatically connected to 26.1*b*, port 6.2*b* to 26.2*b*, etc. after a selection of the first model component and hence its ports as a first set of ports, and the second model component and hence its ports as a second set of ports.

However, it is not possible in the prior art to initiate the automatic display of a possible assignment or the automatic connection for only substructures of the model components and/or to automatically connect ports having different higher-level hierarchy levels to one another in a graphical user interface. As soon as a first model component 55 has, for example, one more higher hierarchy level (group 3) than a second model component 75*c* with the hierarchy elements 22*c*, 24.3*c*, 25.3*c*, and 25.4*c* and the ports 26.7*c*, . . . 26.10*c*, as is shown in FIG. 3, it is no longer possible in the prior art to recognize, display, and automatically connect possible assignments for the ports of the first and second model components, since they are tested for identity in the hierarchy starting from the top hierarchy level, for example.

The convenient display and establishment of matching connections between ports of different model components or different parts of model components of a system corresponding to the semantic context of the (directed) ports represents an important task in the realm of creation, configuration, and in particular also integration, which is to say linking, of large models.

If, for example, one considers a model component that has several hundred ports and that, based on the semantic context, should be connected in a matching fashion with one or more other model components and/or parts of model components, it is directly evident that a manual connection of all the individual ports, for instance by drawing a connecting line between the ports, by "drag & drop", or by another manual user action, is painstaking and prone to error.

In the case of an automatable system, an alternative according to the prior art would be for the user to "program" the connection between the ports, for instance in the form of an automation script.

For a user accustomed to operating a graphical user interface, however, this entails a disruption, and the user must familiarize himself with new circumstances (for example, the programming language of the automation script). Moreover, a clear representation in which one can see the context of a port at a glance is considerably more difficult in a programmatic implementation than in a visual representation such as is shown in FIG. 1*b*, for example.

SUMMARY OF THE INVENTION

It is therefore an object of the present invention to enable a user of a system to achieve a connection in a graphical user interface between a plurality of ports matching the context by a single operating step, or as few operating steps as possible, without errors.

In particular, this should also be possible when structured model components to be connected or the parts of structured model components that are to be connected do not have the same hierarchy level on the two sides to be connected, as is shown in FIG. 2, but instead have a different hierarchical structure, as shown in FIG. 3. What ports can be connected to one another and what ports cannot, should be detected automatically. Such possible connections are shown in FIG. 4, where the solid-line connection 41c represents a possible assignment that should be automatically connected, since it has the highest correspondence. The dashed connections 42c, 43c, 44c represent alternative assignments.

The invention enables the user to initiate a connection from arbitrary hierarchy elements of one model component to arbitrary hierarchy elements of the other model component, regardless of whether they are located at the same hierarchy level, in such a manner that the "matching" ports below the selected hierarchy elements of the applicable model component are automatically displayed and/or connected. In this process, display of a "wrong" assignment or the connection of "wrong" ports is prevented by taking into account factors including information on direction and structuring (which is to say the "context" of a port).

The object is achieved in an exemplary embodiment by a method for configuration of a model of a technical system on a computer having a display for automatically displaying possible assignments and connecting model components of a model of a technical system takes place on a computer with a display, wherein the model has a first model component and a second model component.

The first model component and the second model component each have at least one hierarchy element, wherein a hierarchy element contains no hierarchy element, or one hierarchy element, or multiple hierarchy elements.

A hierarchy element has no port, one port, or multiple ports, wherein a hierarchy element has an identifier and a port has an identifier.

A connection between a first port and a second port represents an assignment in the technical system.

Now the method includes a first set of hierarchy elements and/or ports and a second set of hierarchy elements and/or ports are selected through a graphical user action, and in that a possible assignment is tested for a first port of the first set and a second port of the second set and, if a possible assignment is present, this possible assignment is displayed on the computer's display and/or the first port of the first set is automatically connected to the second port of the second set.

An alternative form of the method is that a first set of hierarchy elements and/or ports and a second set of hierarchy elements and/or ports are selected through a graphical user action, and in that a possible assignment is tested for a first port of the first set and every port of the second set and, based on a predefinable first strategy, one assignment is selected from the set of all possible assignments of the first port of the first set with a port of the second set, and the selected assignment is displayed and/or the first port of the first set is connected to a port of the second set in accordance with the selected assignment.

A possible assignment is present in accordance with the invention if, for the first port and the second port, and ascending from the first port and the second port in accordance with the hierarchy, the identifiers of the particular hierarchy elements that are at a higher level than the first port and the second port each correspond at equal hierarchy levels up to a predefinable number of hierarchy levels starting from the port, or are evaluated as corresponding in accordance with a predefined rule.

The predefinable number of hierarchy levels determines the minimum number of hierarchy levels to which the identifiers of the hierarchy elements must correspond or be evaluated as corresponding, and thus defines a minimum correspondence of the identifiers in the hierarchy of the two ports. If no minimum number is predefined, a complete correspondence of the identifiers in the hierarchy of the ports must be present to the highest hierarchy level of one of the two ports. This means that if a first port has six higher-level hierarchy levels and a second port has four higher-level hierarchy levels and no minimum number of hierarchy levels for correspondence is predefined, then the identifiers of all higher-level hierarchy elements of the second port must correspond at the same hierarchy level to the identifiers of the higher-level hierarchy elements of the first port. The same applies when the first port has fewer higher-level hierarchy levels than the second port, in which case the identifiers of all higher-level hierarchy elements of the first port likewise must correspond at the same hierarchy level to the identifiers of the higher-level hierarchy elements of the second port. Examples for a predefined number of hierarchy levels are given in the exemplary embodiments.

In an embodiment, before an automatic connection is made between a first port of the first set and a port of the second set, all ports of the second set are tested for a possible assignment with the first port.

In this process, a test is performed for every possible assignment to determine the number of hierarchy levels to which the identifiers for the first port and the second port, and, ascending from the first port and the second port in accordance with the hierarchy, the identifiers of the hierarchy elements that are at a higher level than the first port and the second port, each correspond or are evaluated as corresponding at equal hierarchy levels starting from the port.

In this embodiment, the first strategy, for example, provides that the assignment for automatic display and/or connection is selected in which the number of correspondences of the identifiers in the hierarchy starting from the first port and the second port is greatest. According to the invention, a minimum correspondence can be defined through the predefinable minimum number, wherein in this preferred embodiment the assignment with the highest correspondence is selected from all the possible assignments that fulfill this minimum correspondence, which is to say that in the set of possible assignments of the first port of the first set with a port of the second set, the assignment having correspondence of the identifiers of hierarchy elements at the highest hierarchy level is selected for which the identifiers for each lower-level hierarchy element at the same hierarchy level and for the ports correspond or are evaluated as corresponding.

Hence, the correspondence of the identifiers in the hierarchy of two ports is tested and a number of correspondences is determined from the bottom up, which is to say from the bottom (i.e., starting from the port) to the top in the hierarchy.

In other words, the number of correspondences between a first and a second port is determined from the bottom up by the means that, in each case, starting from the port and proceeding "upward" in the hierarchy structure the number of hierarchy elements that are identical based on a measure of correspondence is counted until an inequality in terms of the measure of correspondence is present. As soon as two of the identifiers of two hierarchy elements do not correspond or cannot be evaluated as corresponding, no further test for correspondence is performed, so that the number of correspondences is equal to the number of hierarchy levels of two ports whose identifiers at the same hierarchy level starting from the port correspond or can be evaluated as corresponding.

If one takes an identical identifier, which is to say name, as the measure of correspondence then the number of correspondences is determined by first testing whether the two ports have identical names. If this is not the case, the number of correspondences is zero.

If the two ports have identical names, then the name of the hierarchy element located directly above the first port is compared with the name of the hierarchy element located directly above the second port. If they do not correspond, the number of correspondences is one. If they do correspond, the process proceeds to the next-higher hierarchy element on both sides until the highest hierarchy element is reached on one side or names that do not correspond are found.

However, it is possible for two possible assignments to have corresponding identifiers up to the same number of hierarchy levels. In another embodiment, it is possible to predefine by means of a second strategy how to proceed with two possible assignments to one port that both have the same highest number of correspondences.

For example, the second strategy includes in selecting no assignment. In another embodiment, a port can be connected multiple times. In this embodiment, the second strategy includes, for example, selecting all assignments for which the hierarchy level is the same and which have the highest number of correspondences. Alternatively, the second strategy is in selecting only the first assignment with the highest number of correspondences, or displaying all assignments for which the hierarchy level is the same and which have the highest number of correspondences, or asking the user, prior to an automatic connection, which of the possible assignments should be used for a connection.

In another embodiment, ports that were already connected before the selection of the first set of ports and the second set of ports are not considered in the test for a possible assignment.

In another embodiment, one or more hierarchy elements of the first set and/or one or more hierarchy elements of the second set are excluded from the testing of the identifiers at the same hierarchy level.

In another embodiment, a port is either an input port or an output port, and a possible assignment is only recognized between an input port and an output port.

In another embodiment, an output port is associated with a data type and an input port is associated with a set of data types that can be processed by this port, wherein a possible assignment between an input port and an output port is only recognized if the input port can process the data type of the output port.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7 shows an exemplary table of the number of correspondences between ports of a first set and ports of a second set;

FIG. 8 shows an exemplary table of the number of correspondences between ports of a first set and ports of a second set when a structural hierarchy level is not considered;

FIG. 12 shows a matrix of the number of correspondences between ports of a first set and ports of a second set;

DETAILED DESCRIPTION

Figure 4:
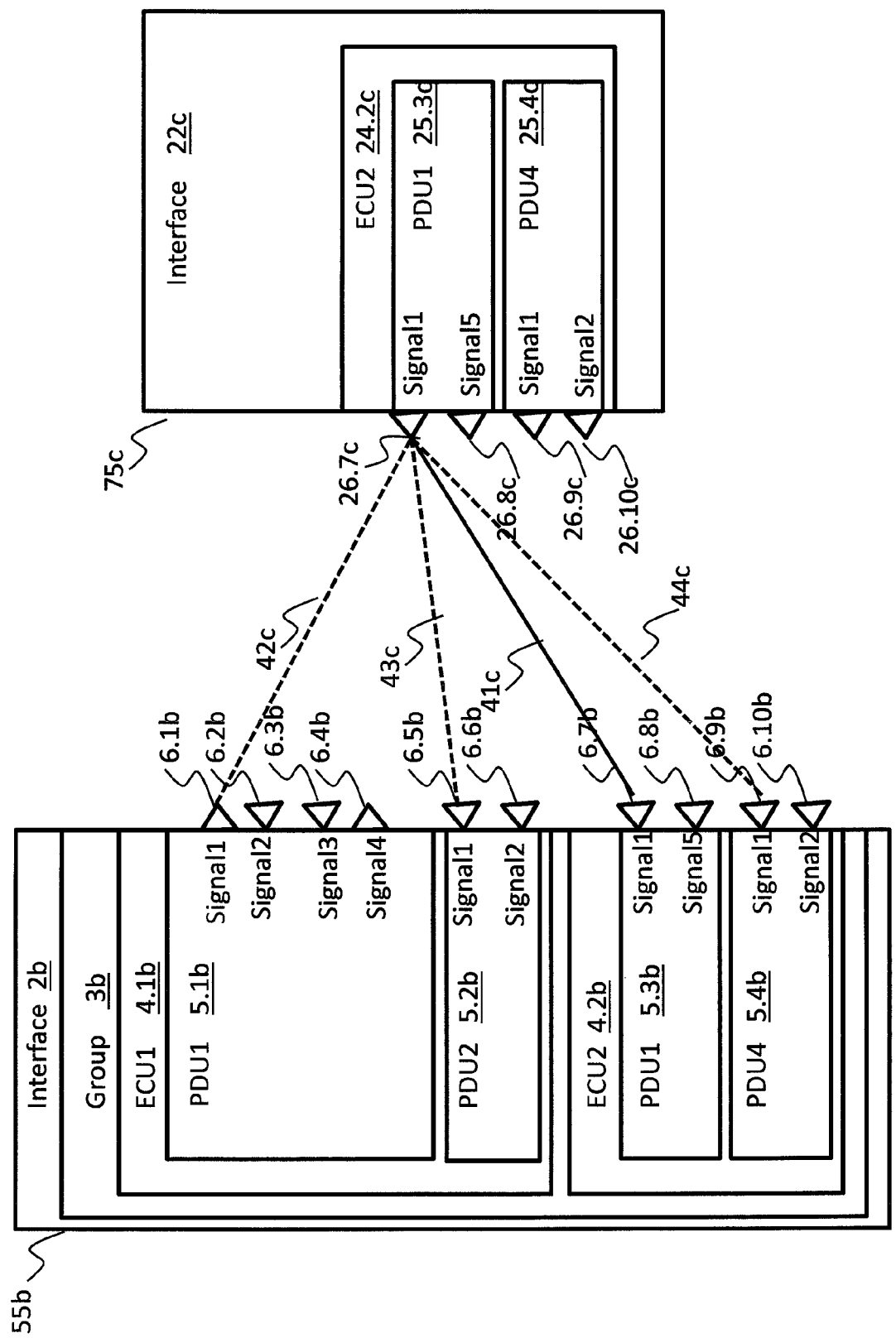
FIG. 4 shows a representation according to the invention of possible assignments between two ports.

One possible goal of the object is shown in FIG. 4, namely in the case that two sets of ports are selected from two model components with different hierarchies, a display and/or automatic connection 41c of the matching ports 6.7b and 26.7c having the highest number of correspondences based on identifiers and hierarchy levels.

Selection of the first set of ports and the second set of ports is made by mouse, for example, in that the port 26.7c is selected as the first set and the hierarchy element "interface" 2b, and hence all of the ports 6.1b, 6.10b located below this hierarchy element, are selected as the second set of ports.

Figure 5:
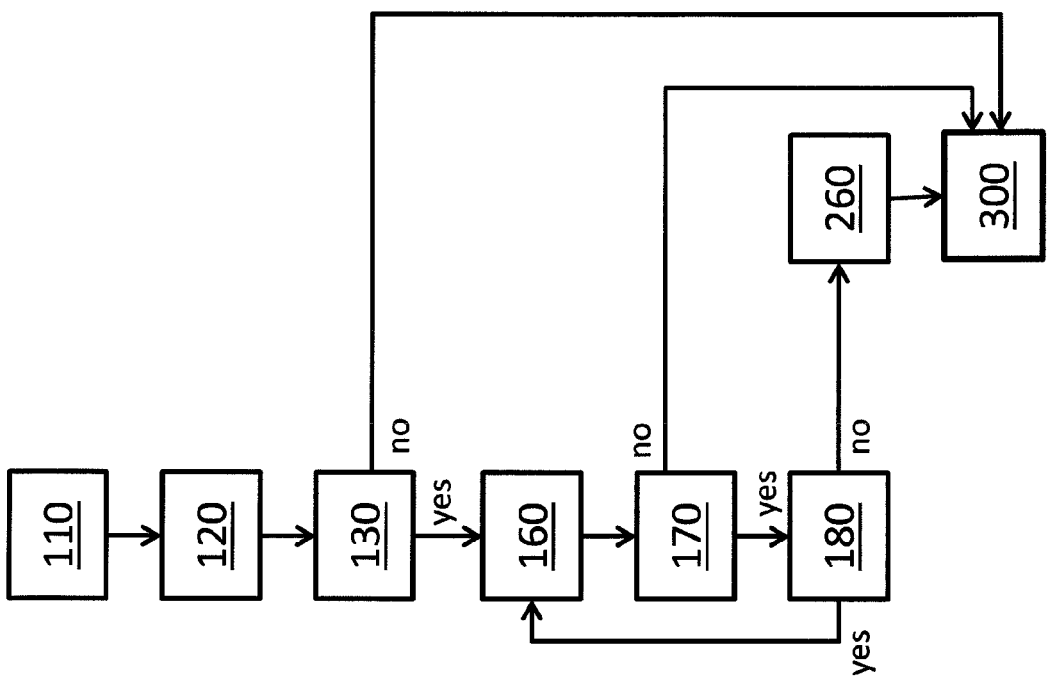
FIG. 5 shows an exemplary sequence of operations of the method in accordance with an embodiment of the invention.

An exemplary sequence of operations is shown in FIG. 5. In a first step 110, a first set of ports and a second set of ports are selected.

In the next step 120, a first port of the first set and a second port of the second set are selected. A selection takes place, for example, by the means that the first port from a list of ports in the first set and the first port from a list of ports in the second set are taken as the first port and the second port, respectively.

In a step 130 a test is performed to determine whether the identifier of the first port corresponds to or is evaluated as corresponding to the identifier of the second port. If this is not the case, there is no possible assignment between the first and second ports, and the method terminates 300 with regard to the test of the first port of the first set and the second port of the second set.

If the two identifiers of the ports did correspond, or if they were evaluated as corresponding, then the two higher-level hierarchy elements are selected in a step 160. Consequently, the two hierarchy elements at a higher level than the first port and second port are selected as hierarchy elements to be tested after the step 130.

In a step 170 a test is performed to determine whether the identifiers of the hierarchy elements selected in step 160 correspond or can be evaluated as corresponding. If this is not the case, there is no possible assignment between the first and second ports, and the method terminates 300 with regard to testing the first port of the first set and the second port of the second set.

If the two identifiers correspond in step 170, a test is performed in a step 180 to determine whether the two hierarchy elements selected in step 160 again have higher-level hierarchy elements.

If it is established in step 180 that one of the two hierarchy elements selected in step 160 does not have another higher-level hierarchy element, the assignment is automatically displayed to the user on the computer's display as a possible assignment in a step 260, or the first port of the first set and the second port of the second set are automatically connected in a step 260 and the method terminates 300.

The form in which a possible assignment is displayed on the computer's display is immaterial to the invention. Thus a possible assignment can be displayed graphically in the model as shown in FIG. 4 or in a separate table, for example.

In an alternative embodiment of the invention, the step 260 includes displaying the possible assignment and then connecting it. In one form of the invention, a user input confirming the connection of the ports in accordance with the displayed assignment takes place after the display of the possible assignment and before the connection of the corresponding ports.

If both hierarchy elements selected in step 160 have higher-level hierarchy elements, then these two higher-level hierarchy elements are selected as new hierarchy elements for testing in step 160. In addition, a number of hierarchy steps, for example, is predefined to which the identifiers of ports and hierarchy elements should correspond. A minimum number of correspondences is thus predefined.

Figure 6:
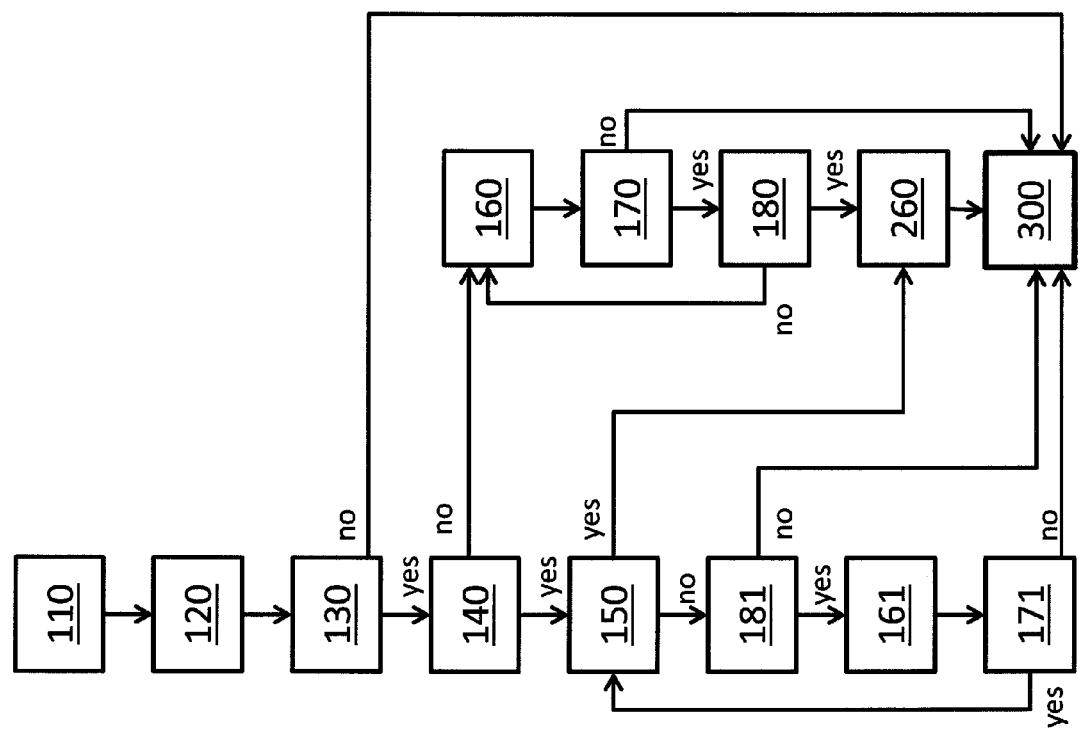
FIG. 6 shows an exemplary sequence of operations of the method in accordance with an embodiment of the invention with a minimum number of correspondences.

An exemplary flowchart with optional specification of a minimum number [of correspondences] is shown in FIG. 6. Steps with the same numbering are identical to the steps in the example from FIG. 5. In the example from FIG. 6, however, a minimum number of correspondences can optionally be predefined. For this reason, after step 130 a test is performed in step 140 to determine whether a minimum number was predefined. If this is not the case, the method proceeds as in the example in FIG. 5, with steps 160, 170, 180, 260, and 300.

If a minimum number of correspondences was predefined, however, then a test is performed in a step 150 to determine whether the minimum number of correspondences has already been reached. If this is the case, the first port of the first set and the second port of the second set are automatically displayed as a possible assignment and/or connected in a step 260, and the method terminates 300.

If the minimum number of correspondences has not yet been reached, then a test is performed in a step 181 to determine whether the last two ports or hierarchy elements tested still have higher-level hierarchy elements.

If one of the last two ports or hierarchy elements tested does not have a higher-level hierarchy element, the method terminates in a step 300 without an assignment having been displayed between the two ports and without the two ports having been connected.

If the last two ports or hierarchy elements tested do still have higher-level hierarchy elements, then these two higher-level hierarchy elements are selected in a step 161, and a test is performed in a step 171 to determine whether the identifiers of the two hierarchy elements selected in step 161 correspond or are evaluated as corresponding.

If the identifiers do not correspond, the method terminates in a step 300 without an assignment having been displayed between the two ports and without the two ports having been connected.

If the identifiers do correspond, step 150 is executed again and a test is performed to determine whether the minimum number of correspondences has been reached.

In one exemplary embodiment, the number one means that only the port names need to correspond. In the example shown in FIG. 4, the assignments 41*c*, 42*c*, 43*c*, and 44*c* would then be possible assignments.

However, if the number two is predefined, then according to the invention all ports are first checked for correspondence of the identifiers, and in the example from FIG. 4 the assignments 41*c*, 42*c*, 43*c*, and 44*c*, which is to say between port 26.7*c* and the ports 6.1*b*, 6.5*b*, 6.7*b*, and 6.9*b*, are found. But since the number two is predefined, a comparison is now made to determine whether the identifiers of the hierarchy element 5.1*b* located directly above the port 6.1*b* in the hierarchy correspond to the identifier of the hierarchy element 25.3*c* located directly above the port 26.7*c* in the hierarchy. Since both identifiers are "PDU1" in this case, the assignment 42*c* is a possible assignment. According to the same principle, the assignment 41*c* between the port 6.7*b* and the port 26.7*c* is a possible assignment, since the identifiers of the ports 6.7*b*, 26.7*c* and of the hierarchy elements 5.3*b*, 25.3*c* correspond on the same hierarchy level up to a count of two hierarchy levels. The situation is different for the assignments 43*c* and 44*c*. Even though the correspondence between the port 6.5*b* and the port 26.7*c* matches at a count of one hierarchy level, which is to say at the port level, it no longer matches at a count of two hierarchy levels, which is to say one hierarchy level above the applicable ports, since the identifier "PDU2" of the hierarchy element 5.2*b* located directly above port 6.5*b* in the hierarchy does not correspond to the identifier "PDU1" of the hierarchy element 25.3*c* located directly above port 26.7*c* in the hierarchy. Similarly, the identifier "PDU2" of the hierarchy element 5.4*b* located directly above port 6.9*b* in the hierarchy does not correspond to the identifier "PDU1" of the hierarchy element 25.3*c* located directly above port 26.7*c* in the hierarchy.

If the number three is predefined as the number of hierarchy levels, and hence as the number of correspondences, an assignment is not classified as a possible assignment until the identifiers of the ports and the two hierarchy elements directly above the two ports correspond. If the assignments 41*c*, 42*c*, 43*c*, and 44*c* were possible assignments when the number of correspondences was one, and the assignments 41*c* and 42*c* were possible assignments when the number of correspondences was two, then only the assignment 41c is a possible assignment with three as the number of correspondences, since the identifiers "Signal1" of the ports 6.7b and 26.7c correspond, as well as the identifiers "PDU1" of the hierarchy elements 5.3b and 25.3c that are directly above the ports in the hierarchy and thus located at the same hierarchy level, and also the two identifiers "ECU2" of the hierarchy elements 4.2b and 24.2c that are directly above hierarchy elements 5.3b and 25.3c in the hierarchy and thus located at the same hierarchy level.

FIG. 7 shows an exemplary table in which the number of correspondences with reference to the example in FIG. 4 was selected by selecting the hierarchy element 25.3c "PDU1", and thus the ports 26.7c and 26.8c, as the first set of ports, and by selecting the hierarchy element 3b "group", and thus all ports of the model component 55b, as the second set of ports.

It is evident from the exemplary table in FIG. 7 that no possible assignment is found for a predefined number of correspondences equal to four, since the identifiers "group" and "interface" are different at this hierarchy level.

In another embodiment, it is possible for there to be hierarchy levels that should be ignored in comparing the identifiers of the hierarchy levels. Thus, for example, the hierarchy element 3 "group" of the model component 55b in FIG. 4 is a structural level that only serves the purpose of clarity where appropriate, but has no technical relevance. Thus in this embodiment it is desired that the system should recognize that the ports 6.7b and 26.7c correspond to a number of correspondences of four without taking the hierarchy element 3b into account, in other words up to the hierarchy element 2b or 22c "interface". To this end, it is made possible in this embodiment to exclude hierarchy elements from a testing for correspondence. In the example using FIG. 8, based on FIG. 4, the hierarchy element 3b "group" could therefore be excluded from the test so that the hierarchy element 2b "interface" is located above the hierarchy elements 4.1b and 4.2b, and a number of correspondences equal to four would be recognized for the ports 6.7b and 26.7c as well as 6.8b and 26.8c. In this example the hierarchy element "group" is excluded, by which means an identical higher-level hierarchy is obtained for the ports 6.7b and 26.7c as well as 6.8b and 26.8c. In like manner, a different hierarchy element could be excluded from the test, so that there are despite the removal of a hierarchy element, different higher-level hierarchies.

Figure 9:
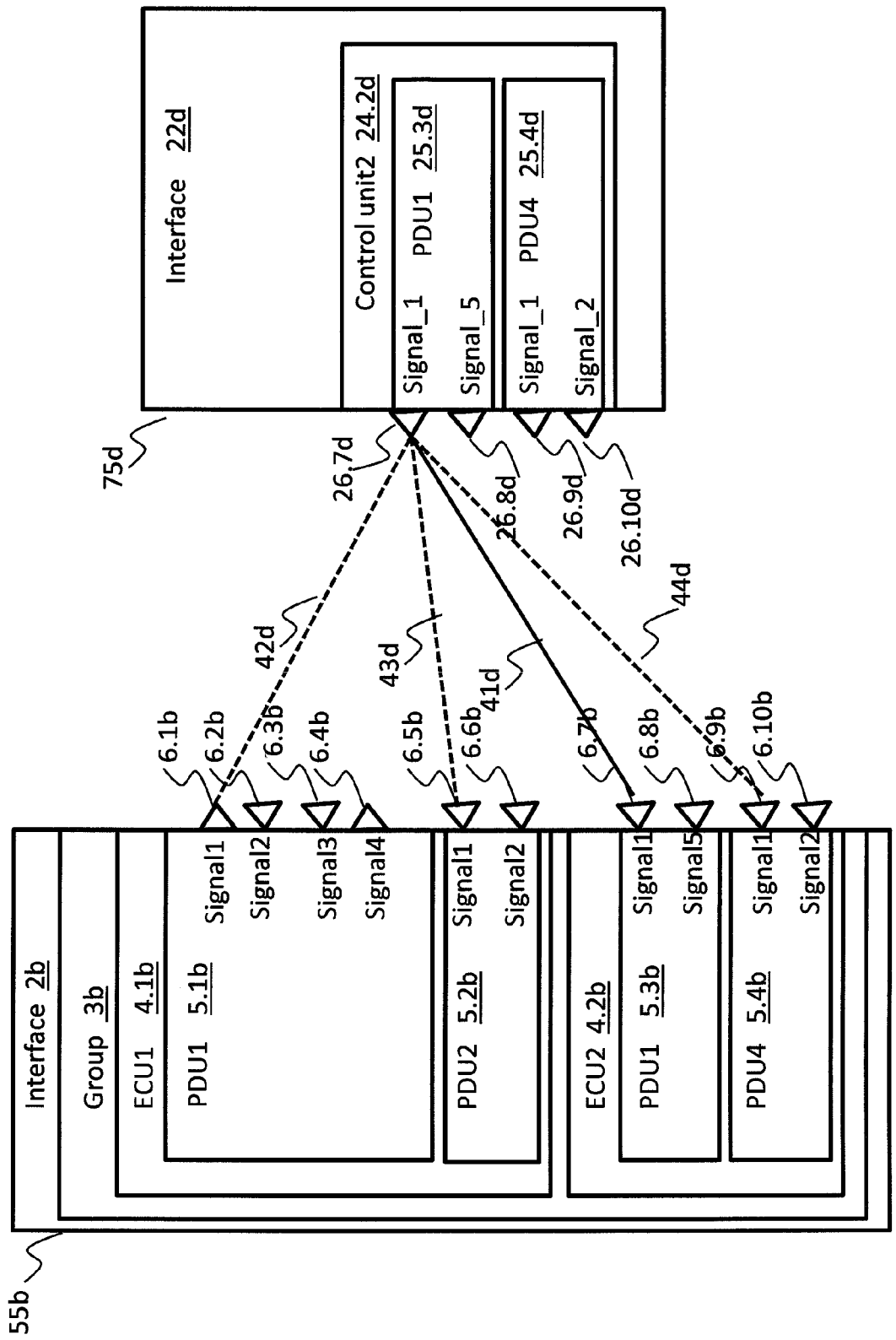
FIG. 9 shows a representation of possible assignments between two ports with different identifiers of the ports and/or higher-level hierarchy levels that are to be evaluated as equal.

In another embodiment, it is possible to define which identifiers are to be evaluated as the same. It is shown in FIG. 9 that the ports 26.7d, . . . 26.10d and a hierarchy element 24.2d of the first model component 75d have different identifiers ("ControlUnit2", "Signal_1", "Signal_2", etc.) from the identifiers for the ports and hierarchy elements of the second model components 55b ("ECU2", "Signal1", "Signal2", etc.), even though the difference consists merely in a synonym or different notation having been used, whereas the same identifiers are actually intended. This scenario can occur, for example, when the model components have been created by different people. In order to nonetheless allow automated assignment, in a preferred embodiment it is possible to define, for example in table form, which identifiers or parts of identifiers should be evaluated as corresponding despite deviation. In the example from FIG. 9, such a definition would be that "Signal1" and "Signal_1", "Signal2" and "Signal_2", "Signal5" and "Signal_5", and "ECU2" and "ControlUnit2" should be evaluated as corresponding, so that in this embodiment, too, a possible assignment 41d is recognized with a predetermined number of correspondences equal to three, and is automatically displayed and/or connected.

Figure 10:
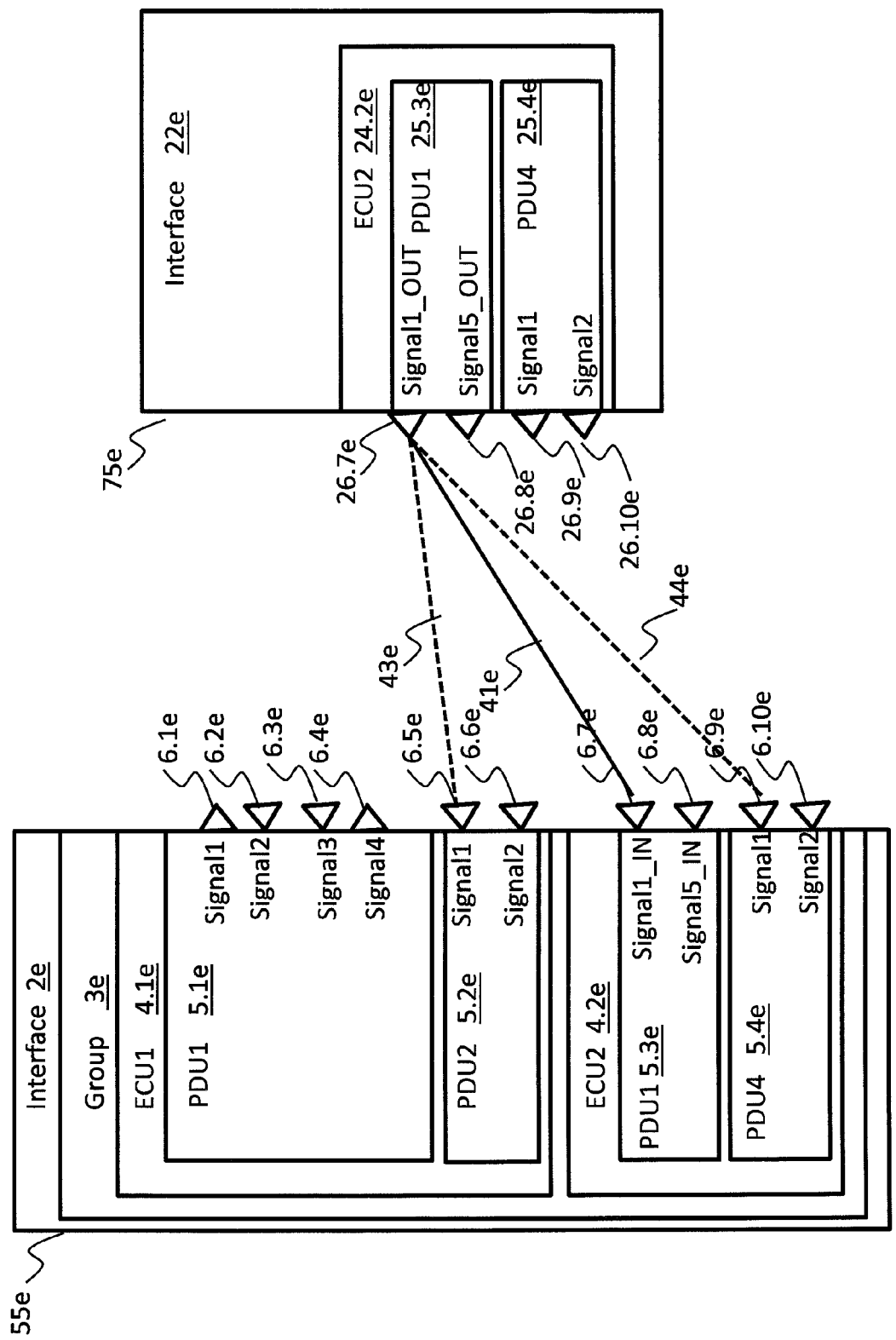
FIG. 10 shows a representation of possible assignments between two ports with different parts of identifiers that are to be evaluated as equal.

In like manner, it is possible to define that parts of an identifier should be evaluated as corresponding despite a deviation, for example when ECU or ControUnit appear within an identifier, or the suffix "_IN" should be equated with the suffix "OUT". Such a case is shown by way of example in FIG. 10. In this example, a rule is used to define either that the suffixes "IN" and "OUT" in the ports 6.7e, 6.8e, and 26.7e, 26.8e should be ignored or that the suffix "_IN" should correspond to an "_OUT" and the suffix "_OUT" should correspond to an "_IN" for the identifiers of the ports of the first set or of the second set, so that an input port ("_IN") is always recognized as a possible assignment with an output port ("OUT"), and displayed and/or connected.

In another embodiment, identifiers or parts of identifiers that are different but should be evaluated as the same are made uniform through a search-and-replace function prior to execution of the method.

In a preferred embodiment, not only is a possible assignment between two ports to be found based on a minimum correspondence, but an assignment with the greatest possible correspondence is also to be found, and this assignment is to be displayed or its ports are subsequently to be connected. To this end, according to the invention a possible assignment is tested for a first port of the first set and every port of the second set. Based on a predefinable first strategy, one assignment is then selected from the set of all assignments of the first port of the first set with a port of the second set that have been recognized as possible assignments, and the selected assignment is displayed and/or the first port of the first set is connected to a port of the second set in accordance with the selected assignment.

In a preferred embodiment, a test is performed for every possible assignment to determine the hierarchy level to which the identifiers for the first port and the second port, and, ascending from the first port and the second port in accordance with the hierarchy, the identifiers of the hierarchy elements that are at a higher level than the first port and the second port, each correspond or are evaluated as corresponding at equal hierarchy levels. The predefinable first strategy makes provision, for example, to select the assignment having the highest number of correspondences in the identifiers ascending the hierarchy starting from the first port and second port. This achieves the result that the assignment not only meets a minimum number of correspondences, but the assignment that has the highest number, and hence the maximum number, of correspondences is selected from among all possible assignments that meet this minimum number of correspondences.

Figure 11:
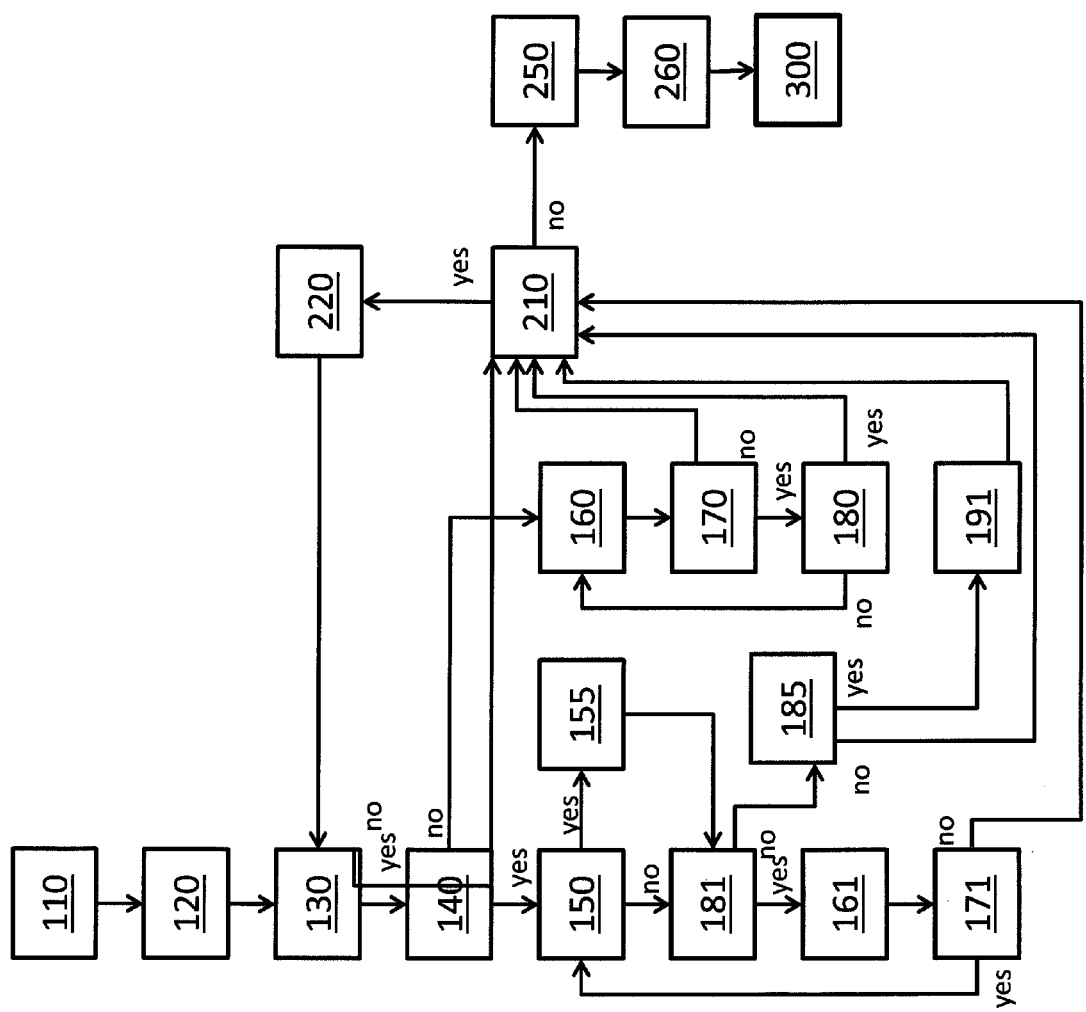
FIG. 11 shows an exemplary sequence of operations of the method in accordance with the invention with a minimum number of correspondences and selection of the highest number of correspondences.

This embodiment is illustrated by way of example in the flowchart in FIG. 11. The same reference numbers as in preceding figures indicate the same steps. If it is recognized in step 150 that the minimum number has been reached, then the first port and the tested port of the second set are stored as a possible assignment in a step 155 before step 181 takes place.

If it is determined in step 181 that one of the last two ports or hierarchy elements tested has no higher-level hierarchy element, then a test is performed in a step 185 to determine whether the assignment between the two ports to be tested is a possible assignment, or in other words whether the two ports to be tested were stored as a possible assignment in step 155.

If the assignment is not a possible assignment, step 210 is executed, which is to say that a test is performed to determine whether there is yet another port in the second set of ports that has not yet been tested for correspondence with the first port.

If the assignment is a possible assignment, the number of correspondences is stored in addition to the possible assignment in a step 191. Next, step 210 is likewise executed.

In step 210, a test is performed to determine whether there is yet another port in the second set that has not yet been tested for correspondence with the first port. If this is the case, then this port is selected as the port of the second set in a step 220, and testing of the first port of the first set now takes place with regard to this port of the second set selected in step 220, starting with step 130.

If it is determined in step 210 that there are no more ports in the second set that have not yet been tested for correspondence with the first port, then according to a first strategy a possible assignment is selected in a step 250, and in a step 260 the two ports belonging to the selected assignment are displayed and/or automatically connected. Subsequently the method terminates 300.

There are various options for making the selection according to the first strategy. For example, a table is created as in FIG. 7, or the possible assignments and their number of correspondences are stored and then the assignment with the highest number of correspondences is selected.

Alternatively, not all possible assignments and their number of correspondences are stored, but instead only the assignment with the highest number of correspondences, so that after every test of the first port of the first set with a port of the second set for correspondence, a comparison is made as to whether an assignment with a greater number of correspondences has already been found, and only the particular assignment with the highest number of correspondences is stored, and is selected after testing of all ports of the second set for correspondence with the first port.

Figure 1A:
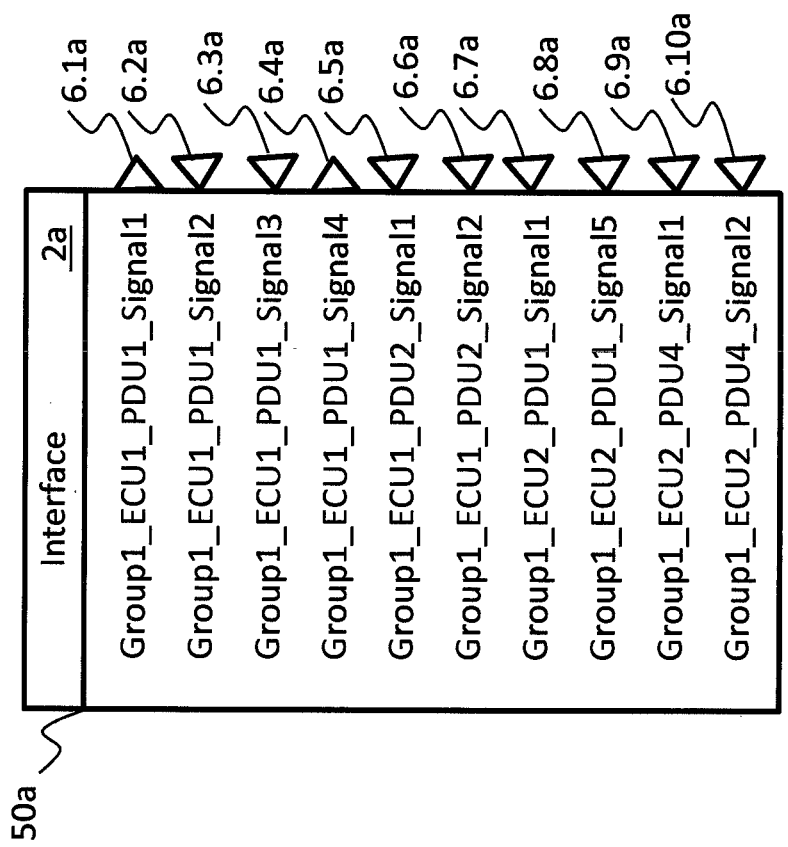
FIG. 1a shows a representation of an unstructured model component.
Figure 1B:
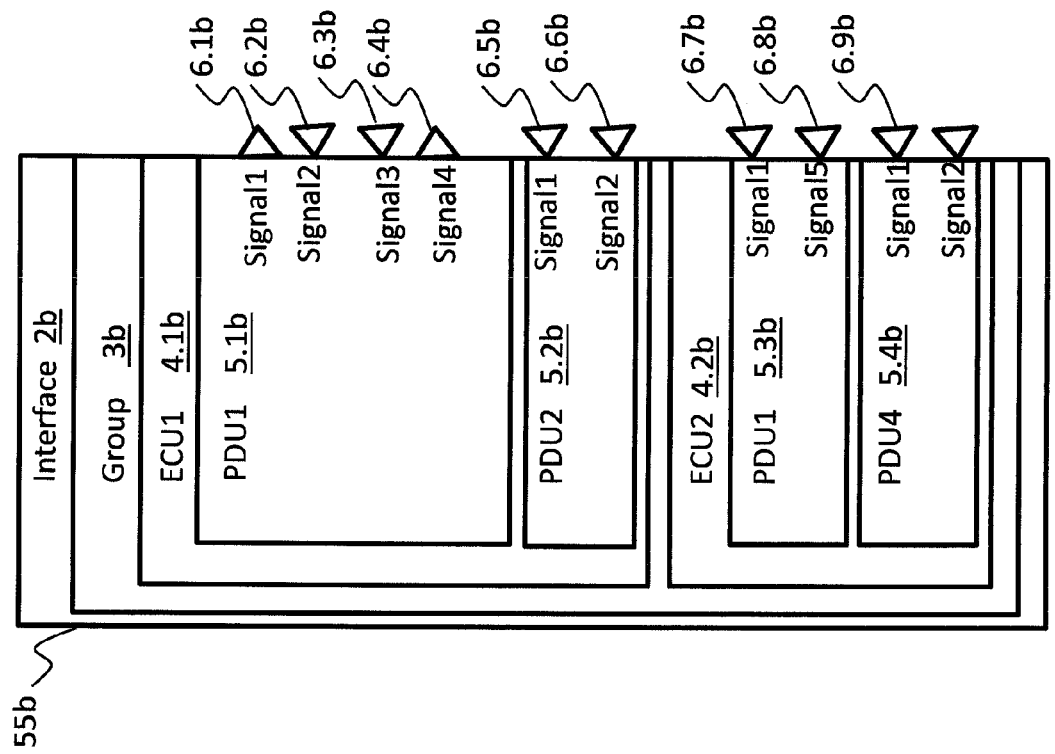
FIG. 1b shows a representation of a structured model component.
Figure 2:
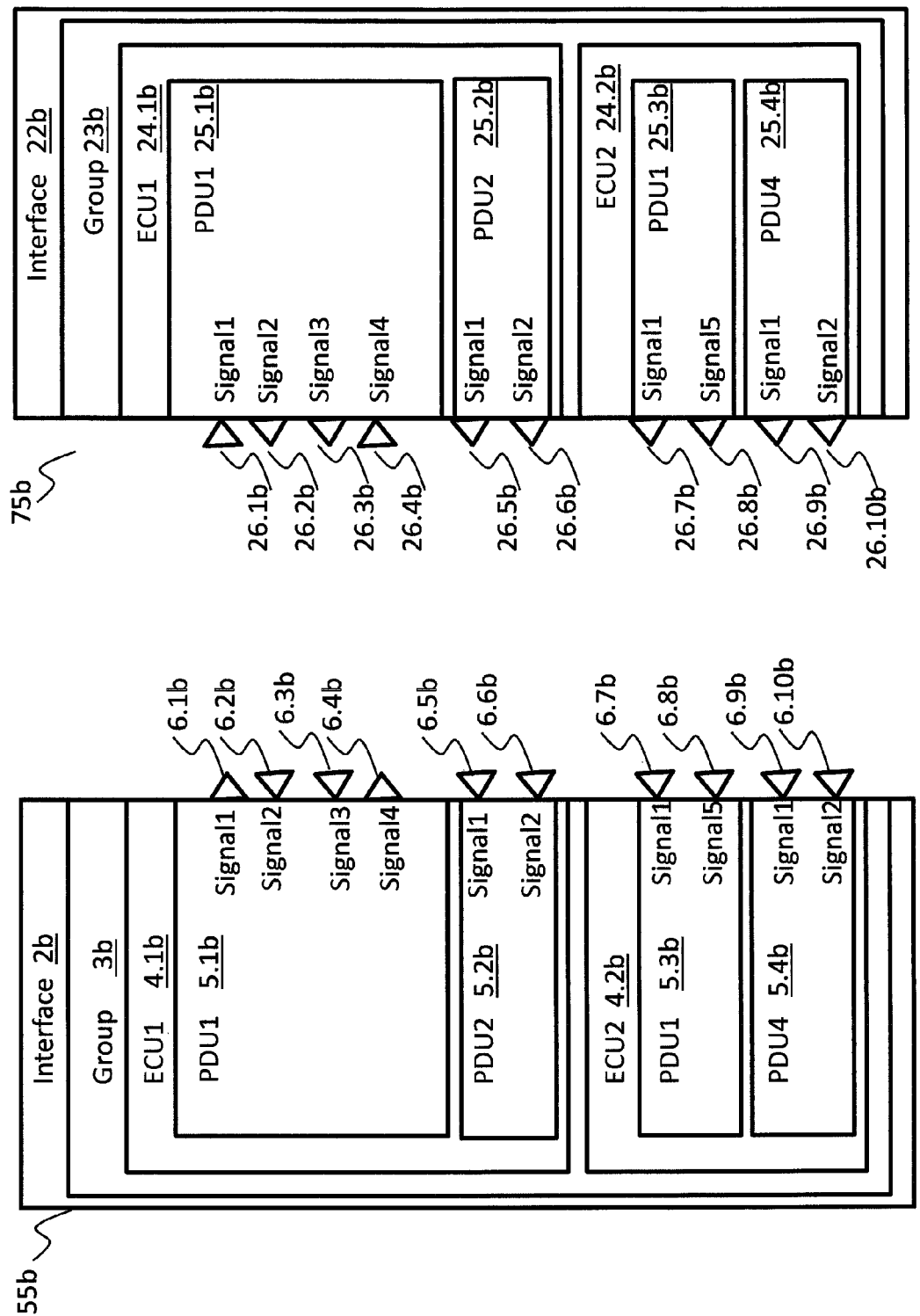
FIG. 2 shows a representation of ports with identical higher-level hierarchy.
Figure 3:
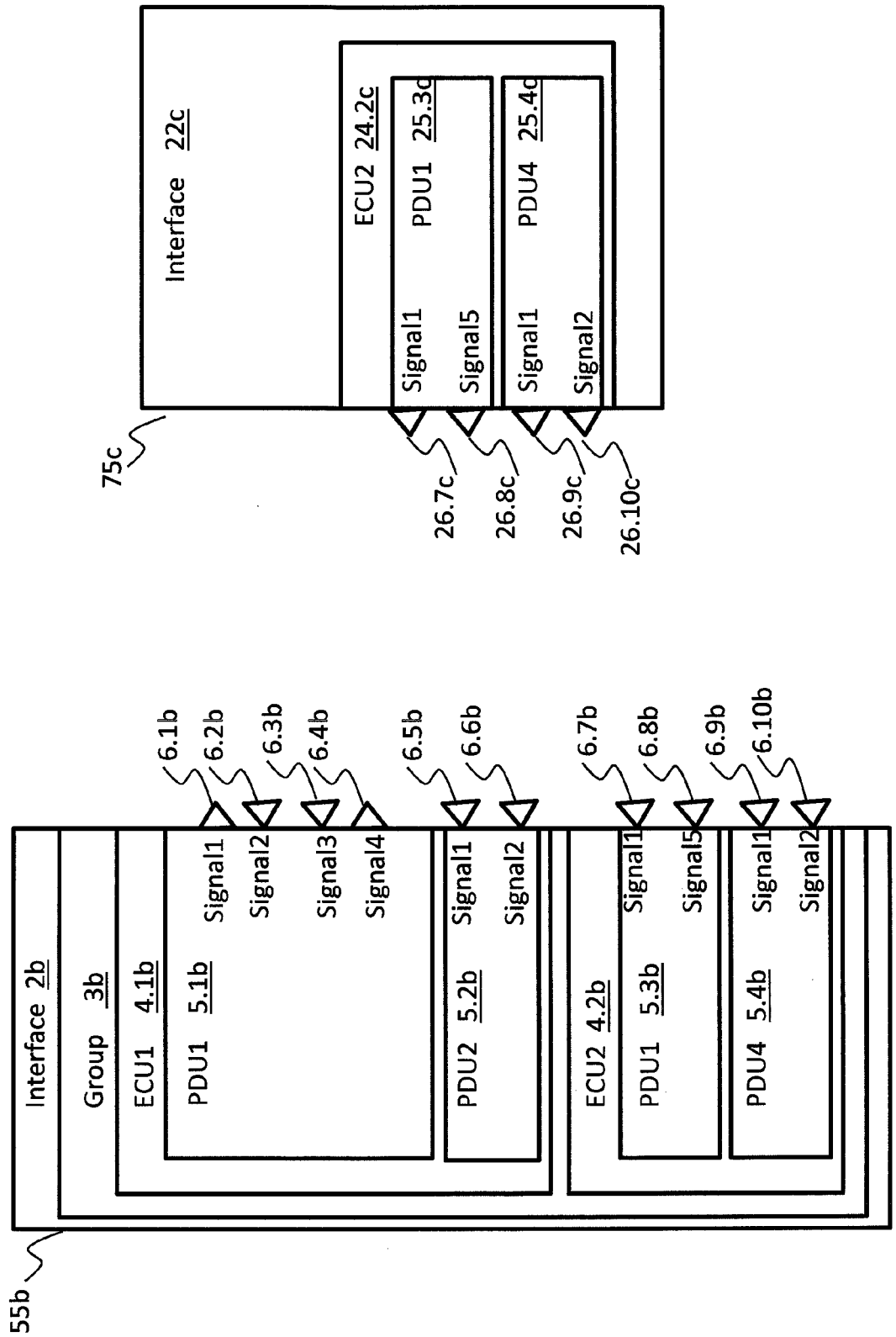
FIG. 3 shows a representation of ports with different higher-level hierarchies.

In another embodiment, a calculation is made in a matrix as to what correspondences are present between the ports of the first set and the ports of the second set. Using this matrix, the two ports with the highest number of correspondences are found and displayed or connected, then the ports with the next highest number of correspondences, etc. Care is taken in this process to ensure that the minimum number of correspondences is present. An example for this is shown in FIG. 12, which refers to FIG. 3. The interface 2*b* was selected as the first set of ports. The corresponding ports are listed in the first column of FIG. 12. The hierarchy element 24.2*c* "ECU2" was selected as the second set of ports. The corresponding ports are specified in the first row of FIG. 12. Using the table in FIG. 12, it is now possible to identify, from an entry in the row of a port of the first set and the corresponding column of a port of the second set, how large the highest number of correspondences between these two ports is.

Figure 13:
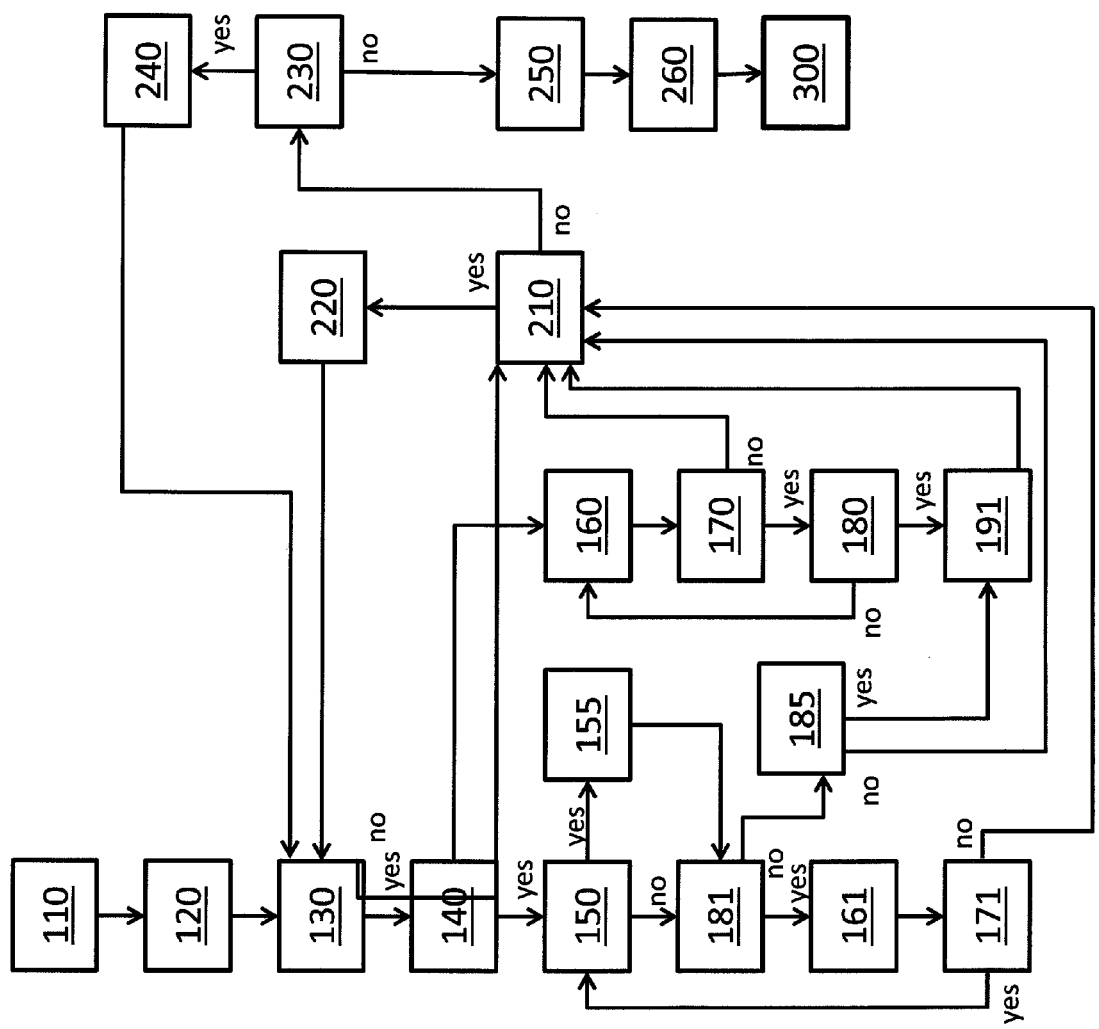
FIG. 13 shows another embodiment of an exemplary sequence of operations of the method in accordance with an embodiment of the invention.

FIG. 13 shows an exemplary flowchart of how a first set of ports and a second set of ports can be tested with respect to an automatic assignment. In contrast to FIG. 11, in the event that it is determined in step 210 that no port remains in the second set that has not already been tested for correspondence with the first port, a test is performed in a step 230 as to whether there is yet another port in the first set of ports that has not yet been tested for possible assignments with ports of the second set.

If this is the case, in a step 240 this port of the first set of ports that has not yet been tested for possible assignments with ports of the second set is selected as the new port of the first set, and the testing of the first port of the first set with the ports of the second set is now performed with regard to this port of the first set selected in step 240, beginning with step 130.

If there is no port of the first set of ports that has not yet been tested for possible assignments with ports of the second set, then a possible assignment is selected using a first strategy in a step 250, and in a step 260 the two ports belonging to the selected assignment are displayed and/or automatically connected. Then this terminates the method 300.

Figure 14:
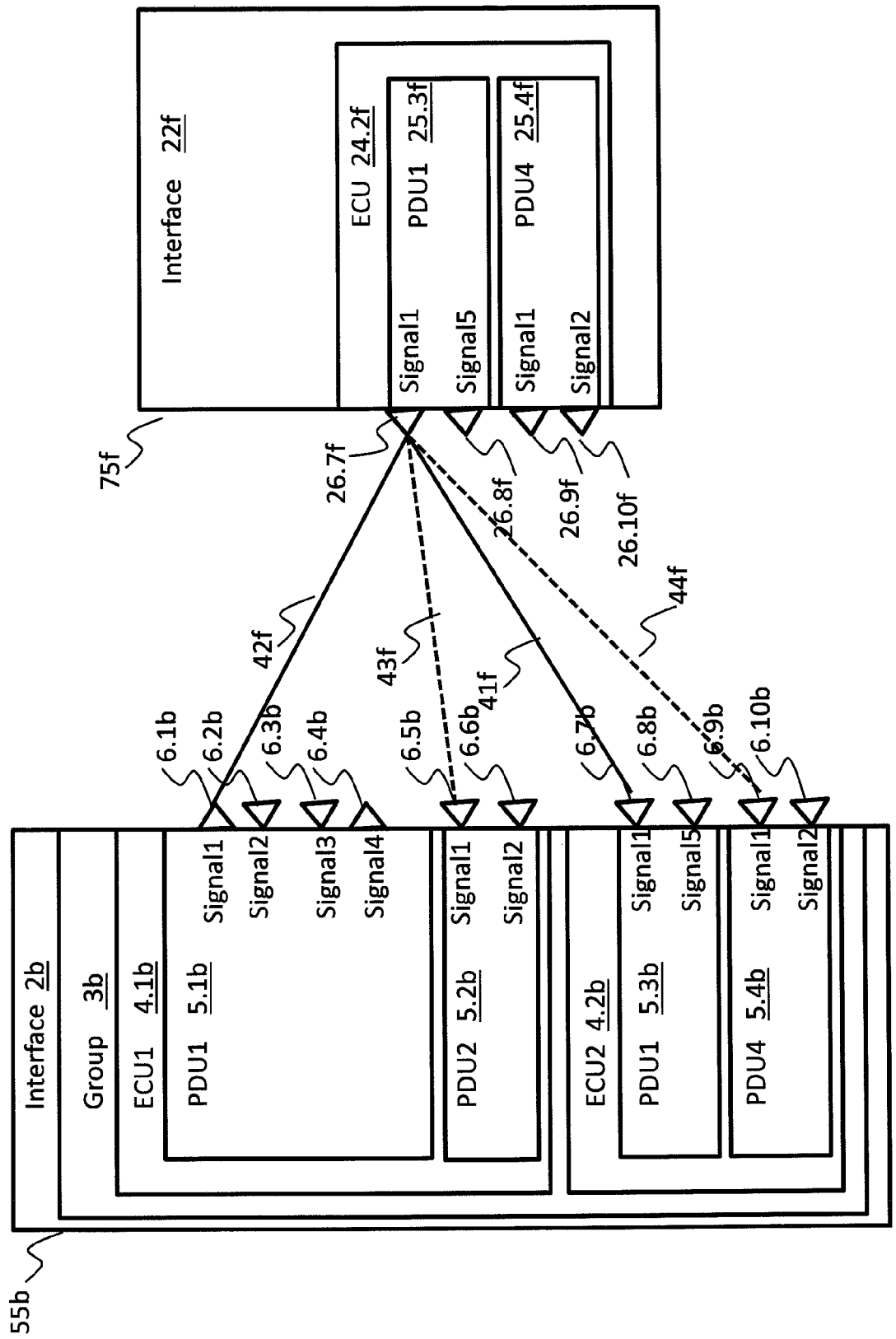
FIG. 14 shows a representation of two possible assignments with the highest number of correspondences.

In another embodiment, it is possible to predefine by means of a second strategy how to proceed in the case of two possible assignments to one port that both have the maximum number of correspondences. One such case is shown in FIG. 14, with the identifiers of the hierarchy elements 5.1*b*, 5.3*b*, and 25.3*f* being identical in this example. For example, if signal 26.7*f* has been selected as the first set of ports and the hierarchy elements "ECU1" 4.1*b* and "ECU2" 4.2*b*, and hence the associated ports 6.1*b*, 6.10*b*, have been selected as the second set of ports, then both the assignment 41*f* and the assignment 42*f* are possible assignments with the highest number of correspondences equal to two. Other possible assignments have a lower number of correspondences.

In one embodiment, one port can be connected with multiple other ports. For example, the second strategy includes selecting all possible assignments, or all possible assignments with a maximum number of correspondences, displaying them, and, for example, connecting the associated ports, so that one port of the first set is connected to all ports with the maximum number of correspondences. In FIG. 14, according to the second strategy all possible assignments with a maximum number of correspondences would be selected and displayed and, for example, the assignment 41*f* would be connected, which is to say port 26.7*f* to port 6.7*b*, as would also the assignment 42*f*, which is to say port 26.7*f* to port 6.1*b*.

In a preferred embodiment, when one port is connected multiple times to other ports an automatic notification to the user is generated, for example in the form of a warning or error message.

In other embodiments, in the case of multiple assignments with the maximum number of correspondences, no assignment is selected, or all assignments with the maximum number of correspondences are displayed, or prior to an automatic connection the user is asked which of the possible assignments should be used for a connection.

In a preferred embodiment, ports that were already connected before the selection of the first set of ports and the second set of ports are not considered in the test for a possible assignment. In this way, it is possible to ensure that connections that the user has already made remain in effect, and only the ports that remain unconnected will be connected by means of the method according to the invention.

In another embodiment, additional rules can be defined that must be considered with respect to a possible assignment and an automatic connection. As explained below, such a rule could provide, for example, that only an output port is connected to an input port, or that the compatibility of data types is considered.

Figure 15:
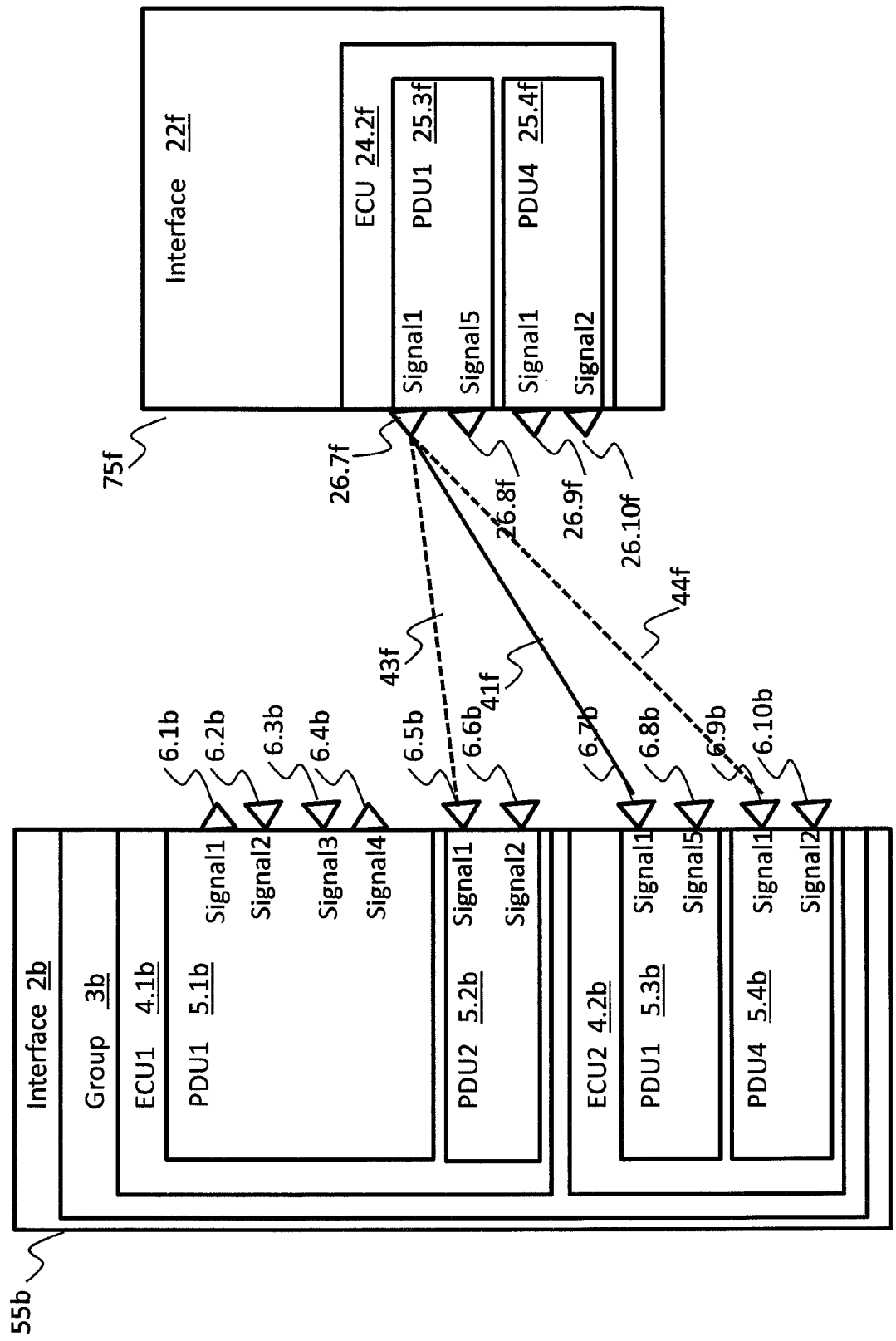
FIG. 15 shows a representation of possible assignments taking into account input ports and output ports.

In a preferred embodiment, a port is either an input port or an output port. Input port means that a model component obtains a signal or one or more data items from another model component through this port. Conversely, output port means that a signal or one or more data items from a model component are transmitted or transferred to another model component. If a port is either an input port or an output port, then in this embodiment a possible assignment is only recognized between an input port and an output port. FIG. 15 shows the example from FIG. 14 taking into consideration the input ports 6.2b, 6.3b, 6.5b, 6.6b, 6.7b, 6.8b, 6.9b, 6.10b and the output ports 6.1b, 6.4b, 26.7f, 26.8f, 26.9f, 26.10f. Under the consideration that an input port can only be connected to an output port, and an output port can only be connected to an input port, there is no possible assignment between the port 26.7f and the port 6.1b, because an output port 26.7f would be connected to an output port 6.1b in this case. Only the assignments 41f, 43f, 44f are possible assignments, of which the assignment 41f has the highest number of correspondences, and thus would be selected, displayed and/or automatically connected in a preferred embodiment.

In another embodiment, a port is either an input port or an output port or a bidirectional port. By means of a rule, it is defined that an input port is connected to an output port or a bidirectional port, an output port is connected to an input port or a bidirectional port, and a bidirectional port is connected to an input port or an output port or a bidirectional port. This rule is then considered during testing for a possible assignment, so that a possible assignment is only displayed in consideration of this rule, or a port is automatically connected with one or more ports in accordance with this rule.

In another embodiment, a port is likewise either an input port or an output port or a bidirectional port. By means of a rule, it is defined that the only assignments possible are those between an input port and an output port, an output port and an input port, or a bidirectional port and a bidirectional port.

In another embodiment, an output port is associated with a data type, so that this output port only transmits data of this data type, and an input port is associated with a set of data types that can be processed by this port. In particular, the set of data types that can be processed by the input port also includes data types that are converted to a suitable data type by means of a type conversion. A possible assignment is only recognized and displayed, or a connection between an input port and an output port is only automatically made, if the input port can process the data type of the output port.

For example, if the output port 26.7 outputs a datum of the data type 16 bit signed integer, and the input port 6.7 can process data of the data types 16 bit signed integer, 32 bit signed integer, or double-precision floating-point format, then the assignment 42 is a possible assignment.

However, if, for example the input port 6.7 can only process a scalar value, but the output port transfers an array of length 3, then no possible assignment is recognized, but instead a test is performed to determine whether the input ports 6.5 or 6.9 can process an array of length 3 and hence are possible assignments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for automatic display of connections and/or connecting model components of a model of a technical system on a computer with a display, the method comprising:
   providing the model with a first model component and a second model component, the first model component and the second model component each have at least one hierarchy element, the at least one hierarchy element has no port or one port or multiple ports, the at least one hierarchy element and a port have an identifier, a connection between two ports represents an assignment in the technical system;
   selecting a first set of hierarchy elements and/or ports and selecting a second set of hierarchy elements and/or ports through a graphical user action;
   testing a possible assignment for a first port of the first set and a second port of the second set, wherein a possible assignment is present if, for the first port and the second port and ascending from the first port and the second port in accordance with a hierarchy, the identifiers of the hierarchy elements that are at a higher level than the first port and the second port each correspond at equal hierarchy levels up to a predefinable number of hierarchy levels starting from the port and/or are evaluated as corresponding at equal hierarchy levels up to a predefinable number of hierarchy levels starting from the port in accordance with a predefined rule;
   displaying, if a possible assignment is present, the possible assignment and/or the first port of the first set is automatically connected to the second port of the second set, or a possible assignment is tested for a first port of the first set and every port of the second set; and
   selecting, based on a predefinable first strategy, one assignment from the set of all assignments of the first port of the first set with a port of the second set that have been recognized as possible assignments, wherein the possible assignment is displayed and/or the first port of the first set is connected to a port of the second set in accordance with the selected assignment.

2. The method according to claim 1, wherein, for each possible assignment a test is performed to determine to which hierarchy level the identifiers for the first port and the second port and, ascending from the first port and the second port in accordance with the hierarchy, the identifiers of the hierarchy elements that are at a higher level than the first port and the second port each correspond or are evaluated as corresponding at equal hierarchy levels starting from the port, and the predefinable first strategy provides for selecting the assignment for which the number of correspondences of the identifiers in the hierarchy starting from the first port and the second port is greatest.

3. The method according to claim 1, wherein a port is connectable multiple times.

4. The method according to claim 3, wherein it is possible to predefine by a second strategy how to proceed with two possible assignments to one port that both have the same highest number of correspondences.

5. The method according to claim 4, wherein the second strategy includes in selecting no assignment, in selecting all assignments for which the number of correspondences is the same, or selecting only the first assignment with the highest number of correspondences, displaying all assignments for which the number of correspondences is the same, or asking the user, prior to an automatic connection, which of the possible assignments should be used for a connection.

6. The method according to claim 1, wherein ports that were already connected before the selection of the first set of ports and the second set of ports are not considered in the test for a possible assignment.

7. The method according to claim 1, wherein a hierarchy element at a higher level than the first port and/or than the second port is excluded from the testing of the identifiers at the same hierarchy level.

8. The method according to claim 1, wherein a port is either an input port or an output port, and a possible assignment is only recognized between an input port and an output port.

9. The method according to claim 8, wherein an output port is associated with a data type and an input port is associated with a set of data types that is processed by this port, wherein a possible assignment between an input port and an output port is only recognized if the input port processes the data type of the output port.

* * * * *